United States Patent [19]
Ward

[11] Patent Number: 5,484,154
[45] Date of Patent: Jan. 16, 1996

[54] WHEELED ACCESSORY FOR EQUIPMENT STANDS

[76] Inventor: Frank R. Ward, 20910 NE. 156th St., Woodinville, Wash. 98072

[21] Appl. No.: 154,869

[22] Filed: Nov. 18, 1993

[51] Int. Cl.⁶ .................................................. B62B 1/12
[52] U.S. Cl. ............ 280/652; 280/43.1; 280/43.15; 280/43.24; 280/47.24; 280/47.21
[58] Field of Search ................................. 280/293, 298, 280/304, 47.18, 47.24, 47.21, 47.34, 63, 47.2, 47.331, 43.1, 43.13, 43.14, 43.15, 43.16, 43.17, 43.24, 638, 35, 639, 645, 646, 42, 652, 43

[56] References Cited

U.S. PATENT DOCUMENTS

| D. 160,679 | 10/1950 | Wilcox et al. | D57/1 |
|---|---|---|---|
| D. 221,634 | 8/1971 | Bradspies et al. | D12/2 |
| D. 263,147 | 2/1982 | Iwasaki | D16/45 |
| 1,111,515 | 9/1914 | Adams | 280/43.1 |
| 2,683,268 | 7/1954 | Strager | 280/63 |
| 2,767,995 | 10/1956 | Stout | 280/293 |
| 2,794,612 | 3/1957 | Clifton | 248/161 |
| 4,327,933 | 5/1987 | Tuggle | 280/47.331 |
| 4,639,005 | 1/1987 | Birkley | 280/43.24 |
| 5,031,926 | 7/1991 | Wannamaker | 280/47.2 |
| 5,203,580 | 4/1993 | Cunningham | 280/47.331 |

*Primary Examiner*—Richard M. Camby
*Attorney, Agent, or Firm*—Stratton Ballew

[57] ABSTRACT

A retractable wheeled accessory for equipment stands is disclosed as having a collapsible axle tube pivotally attached to two interface members which are removably attached to an equipment stand such as a tripod. Wheels are connected to the axle by way of offset crank members. Pivotal rotation of the axle tube by movement of a level arm causes the wheels to alternately engage and disengage a supporting surface. The invention can accommodate various positions of a tripod by adjusting the track of the wheel via the collapsible axle tube and by permitting the two interface members to pivot independently of the orientation of the axle tube.

16 Claims, 3 Drawing Sheets

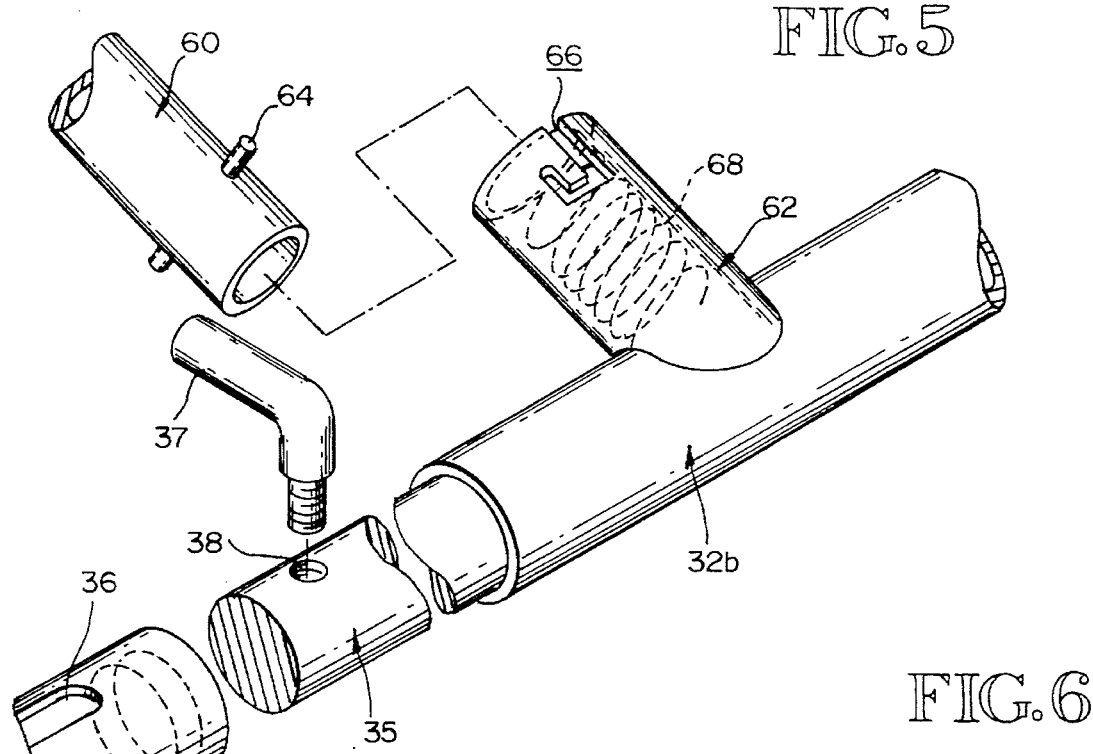
FIG. 5
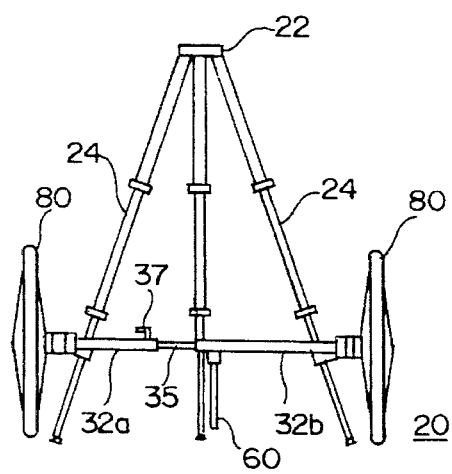
FIG. 7
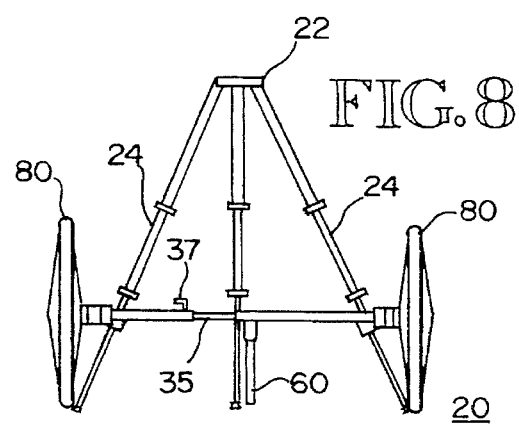
FIG. 6
FIG. 8

WHEELED ACCESSORY FOR EQUIPMENT STANDS

FIELD OF THE INVENTION

The present invention pertains to wheeled accessories for equipment stands and more particularly to wheeled accessories for photographic tripods. The invention permits an equipment stand or tripod to alternately be transported by means of a retractable wheeled assembly or temporarily positioned on a supporting surface by retracting the wheels from contact with the traveled surface.

BACKGROUND OF THE INVENTION

Equipment stands have been in use for many years. These stands have been used for applications ranging from signage and displays, to measuring equipment, to photography. One of the purposes of these stands, which generally are three legged members or tripods, is to provide a stable, usually level, mount for the materials or devices to be used. To this end, these stands have used collapsible legs which permitted the user to locate the stand where desired and adjust the extension of each leg so as to achieve level, regardless of the contour of the supporting surface. Because these devices are generally portable, much attention has been given to constructing these devices so as to be very light and compact.

In areas of the art where relatively level and smooth support surfaces are encountered, more attention has been given to equipment stands having a very rigid structure. These stands are generally heavier than units designed to be portable. In order to provide mobility, these stands often have caster wheels attached to the legs, thereby permitting easy movement of the stand. When a stationary stand is desired, the caster wheels may be locked in place or individually rotated so as to no longer contact the supporting surface.

Noticeably lacking, however, is a portable unit having wheels which permit easy transportation of the stand, especially when the stand has equipment mounted thereto. For example, in the field of photography, a still camera and telephoto lens can weigh in excess of 10 kg. To avoid wasted time mounting and demounting the photographic equipment from the stand when transporting the same, the equipment often times remains mounted to the stand. This requires the photographer to not only carry the stand, but also the photographic equipment. While a gadget bag or other container for the equipment may assist the photographer in transporting loose equipment, no such carrying device exists for the stand and mounted equipment. Moreover, even if a suitable carrying means existed, the user must shoulder the entire weight.

SUMMARY OF THE INVENTION

The present invention provides a semipermanent means for creating a versatile wheeled accessory for equipment stands. The invention broadly comprises an axle pivotally mounted to the legs of an equipment stand; crank members attached to the end of each axle and having an offset spindle wherein the spindle for each crank member is not coaxially aligned with the axis of the axle; a wheel assembly mounted to each spindle; and a lever arm attached to the axle. The axle is mounted to the legs of the equipment stand so that in a transport position, the wheels of the invention contact a support surface. When transportation of the stand is not desired, the wheels may be pivotally retracted from the support surface by moving the lever arm so as to permit the legs of the stand to contact the surface. Because the wheels are connected to one another by a common axle, movement of the lever arm will cause both wheels to move in unison.

A feature of the invention permits the axle to be mounted to a stand having collapsible legs. When adjusting the elevation of a stand having a common connecting point for its support legs, such as by collapsing one or more legs, the angle created by the adjusted leg with the support surface changes, assuming the location of the feet of the stand do not change. Thus, a rigid interface between the axle of the invention and the legs of the stand would prevent using the collapsible feature of the stand.

The invention provides for a pivotal connection between the legs of the stand and the axle. A collar is attached to the legs of the stand. The collar is in turn pivotally connected to an axle block which is constructed so as to rotatably carry the axle. The axis of rotation between the leg and axle is generally normal to that of axle rotation. Thus, for any given equipment stand footprint, independent adjustment of each leg of the stand can be carried out.

Another feature of the invention permits the footprint of a stand having the invention mounted thereto to be modified. In this embodiment, a collapsible axle tube having two halves is used. A first tube has a reduced diameter portion that is receivable by a second tube. The reduced diameter portion preferably has a bore located therein to receive an alignment member. The outer tube preferably has a closed end slot through which the alignment member extends thereby permitting translational movement of the tubes relative to one another, but preventing rotational movement of the tubes relative to one another. The aligning member may also be a compression imparting component in the form of a flared bolt head or lever that contacts the outer surface of the second axle tube and that engages a threaded portion of the bore of the first tube. In such form, the second axle tube is caused to bear against the inner surface of the first axle tube, to thereby increase friction between the two. A locking nut, associated with the compression imparting component, can increase the friction between the two axle tubes to prevent translational movement once the desired track width is established. By constructing the axle assembly in this manner, the relative footprint of the stand remains fixed but can be adjusted when desired.

Because the invention can be attached at various locations on an equipment stand, a variety of wheel profiles can be used, depending upon the needs of the user. For example, low profile tires having a wide contact area can be used when operating a stand equipped with the invention in soft support surface conditions such as sand or snow. Conversely, narrow, high profile tires can be used when traversing rough terrain.

Similarly, the degree of offset between the axle and the spindle can be varied depending upon anticipated conditions of use. A large offset might be desirable when using the assembly on uneven or rough terrain. Or, a small offset might be desirable when using the assembly on relatively smooth terrain.

BRIEF DESCRIPTION OF THE DRAWINGS

FIG. 5 is an isolated exploded view, in perspective, of the handle-axle interface with components shown in phantom for clarity;

FIG. 6 is a front elevational view of the invention with the wheeled assembly shown in a collapsed form (narrow track);

FIG. 7 is a front elevational view of the invention with the wheeled assembly shown in an extended form (wide track); and FIG. 8 is a front elevational view of the invention with the wheeled assembly shown in an extended form (wide track) and with the tripod in a partially lowered position.

DETAILED DESCRIPTION OF THE INVENTION

Figure 1:
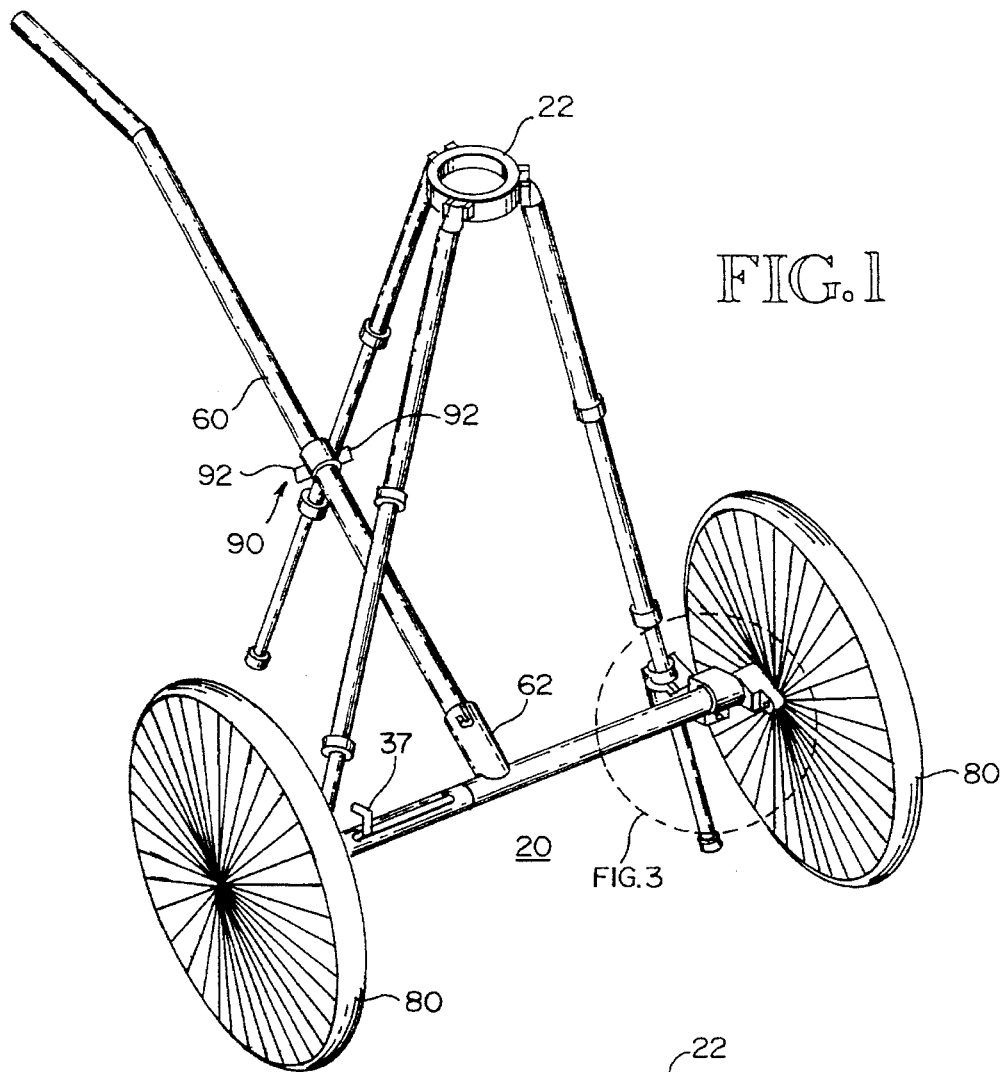
FIG. 1 is a perspective view of the invention.
Figure 2:
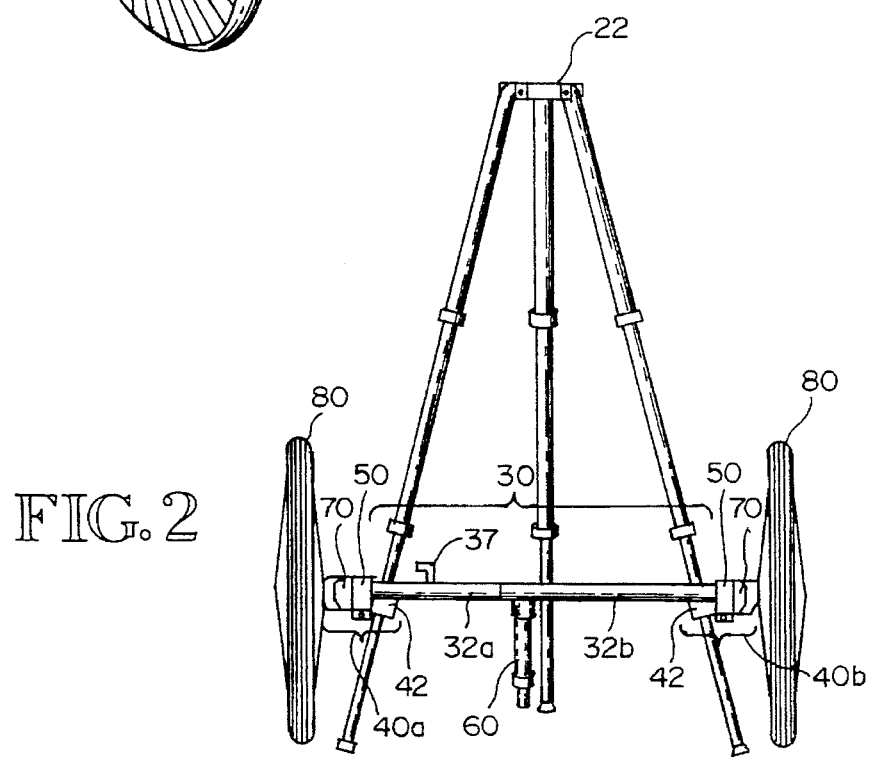
FIG. 2 is a front elevational view of the invention with the wheels in a generally retracted position.

The present invention, as shown in FIG. 1 and FIG. 2, comprises a wheeled accessory for equipment stands. The assembly 20 is mounted to a conventional tripod 22 which is supported by a support surface. The predominant features of assembly 20 include axle assembly 30 comprising axle tubes 32a and 32b; lever arm 60 which is attached to axle tube 32b; and mounting interfaces 40a and 40b comprising their respective crank members 70, axle blocks 50, and collars 42. Wheels 80 complete the basic assembly and are mounted to interfaces 40.

Assembly 20 is mounted to tripod 22 by means of interfaces 40a and 40b (generically identified as interfaces 40). As better shown in FIG. 3 and FIG. 4, each each interface 40 has a split collar 42a and 42b (generically identified as collar 42) and an axle carrier block 50. Split collar 42 is rotatably mounted to block 50 by means of pin 48. Axle tube 32 is rotatably located in carrier block 50 and a leg 24 of tripod 22 is frictionally located in collar 42.

The internal bore characteristics of collar 42 are preferably matched to the dimensions of a tripod leg 24 at the general position that mounting of assembly 20 is desired. A compressible liner of closed cell foam or the like can be disposed intermediate a leg 24 and collar 42 to decrease damage to the leg and enhance the friction between the leg and collar 42.

Collar 42 has two identifiable halves, 42a and 42b. These two halves are commonly joined by hinge pin 44 and may be joined together so as to compressionly grip a tripod leg by means of retaining bolt 46. As described previously, collar 42 is rotatably attached to axle carrier block 50. Carrier block 50 has axle receiving portion 52 formed therein to receive axle tube 32a or 32b since both outboard ends of the axle tubes have similar diameters. To reduce friction resulting from normal wear, a polytetrafluoroethylene (Teflon®) bushing (not shown) may be placed intermediate block 50 and axle tube 32.

Turning to FIG. 5, an enlarged view of axle assembly 30 is shown. As is shown, axle assembly 30 is preferably collapsible so as to accommodate various equipment stand footprints and aid in transporting and storage of the invention. Tube 32b preferably has reduced diameter portion 35 (shown shortened) which is internally receivable by tube 32a. Low friction bushings 33 shown in phantom can be incorporated in machined grooves in tube 32a and tube 32b. As with block 50, these bushings can be Teflon® or other suitable high molecular weight plastic such as polyethylene.

To permit translational movement of tube 32b within tube 32a but prevent rotational movement therewith, threaded hole 38 is machined in reduced diameter portion 35 and closed end slot 36 is machined in tube 32a. Locking arm 37 is threadably engaged with threaded hole 38 and provides necessary compression forces between tubes 32a and 32b so as to prevent translational movement after suitable adjustments are made. Those persons skilled in the art should realize that numerous means exist for permitting translational movement without rotational movement, and that the invention will satisfactorily operate even if rotational movement is permitted during translational adjustment. Consequently, a constricting locking collar or compression nut associated with axle tube 32a would allow translational movement (as well as rotational movement) during the adjusting action, but would prevent both after being set. To prevent all rotational movement when using such a collar, a groove and key arrangement between the tubes 32a and 32b can be provided. In this manner, a user would not have to ensure that crank members 70 remained in alignment when utilizing a locking collar.

Lever arm 60 permits a user to pivot axle assembly 30. Arm 60 is removably attached to either axle tube 32a or 32b but should not be attached to the reduced diameter portion of axle tube 32b since this portion of the tube must slide within axle tube 32a. In a preferred embodiment shown in FIG. 5, axle tube 32b has a mount associated therewith. The means for engaging lever 60 in the mount takes the form of a spring-loaded bayonet mount 62. Thus, lever 60 has a locating pin 64 that is receivable in slot 66. Inserting lever 60 into mount 62 causes spring 68 to compress. A slight rotational movement of lever 60 engages it with mount 62. Spring 68 maintains a constant pressure against lever 60 to that it cannot be easily dislodged. This form of engagement provides a quick and efficient way of attaching lever 60 to axle tube 32, although other means are known to exist.

A rotatable keeper 90 can be conveniently mounted to the opposing leg of tripod 22 so as to hold arm 60. This feature is shown best in FIG. 1. Because variance of the wheel track, i.e. extension or contraction of axle assembly 30, causes the relative lateral position of lever 60 to change, rotatable keeper 90 has extended wings 92 so as to receive arm 60 irrespective of its lateral position. Lever 60 can be disengaged from keeper 90 by simple rotation.

Figure 3:
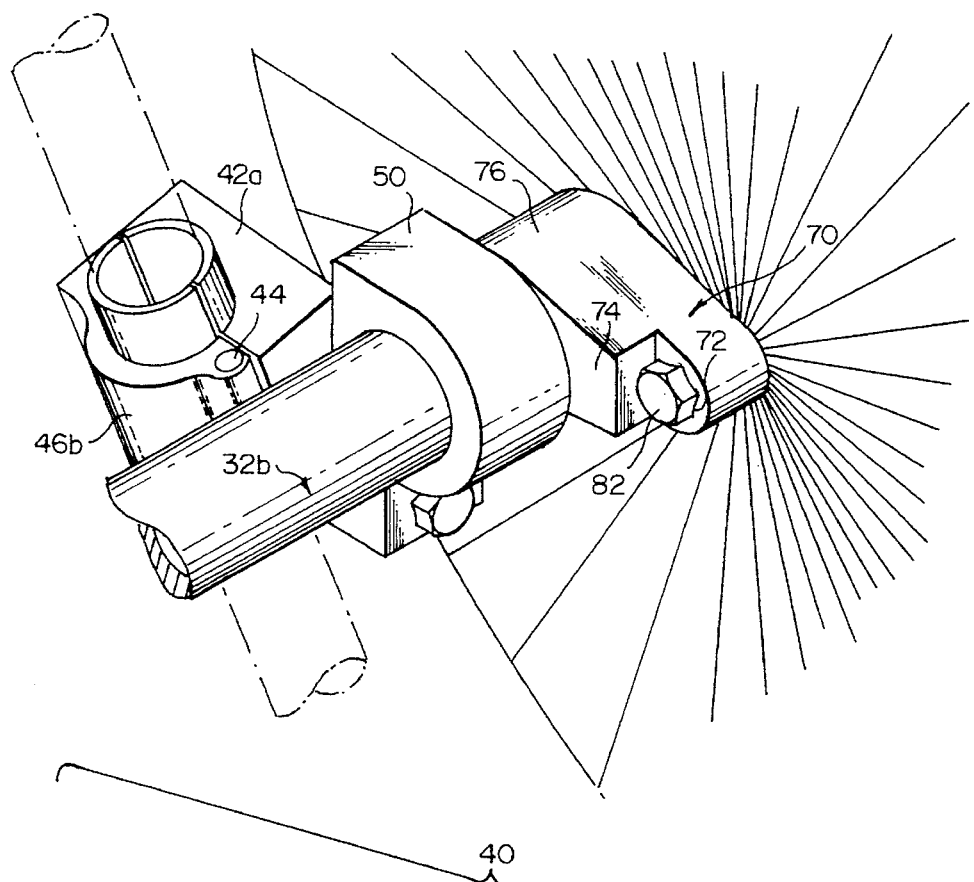
FIG. 3 is an enlarged perspective view of the tripod-wheeled assembly interface of FIG. 2.
Figure 4:
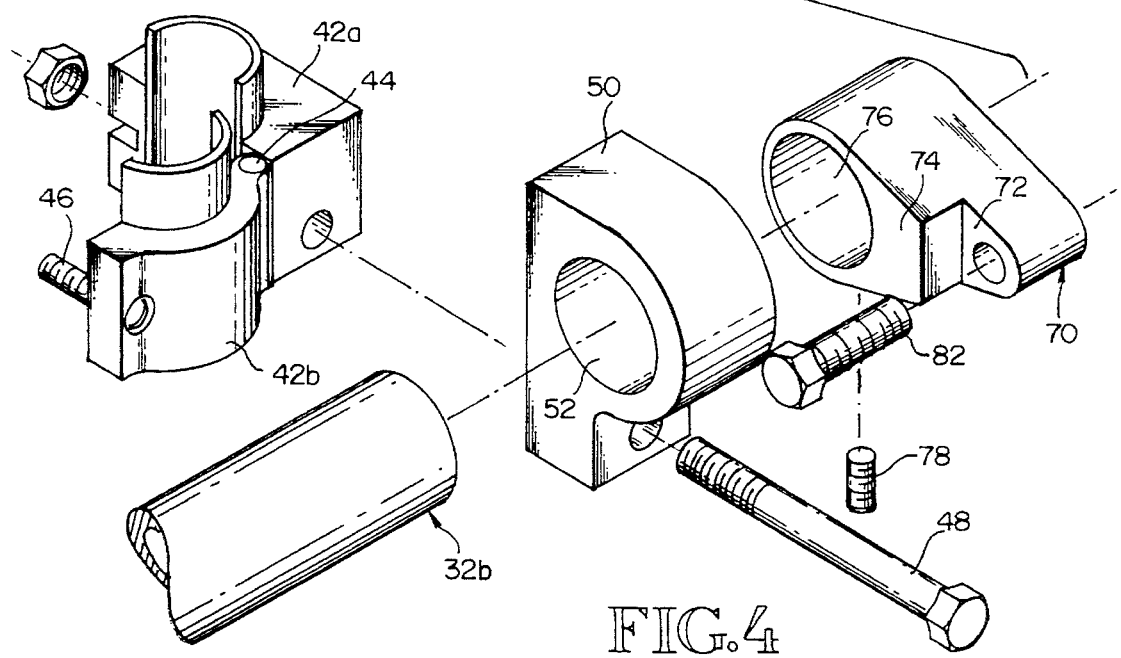
FIG. 4 is an isolated, exploded view of the interface assembly of FIG. 3.

Turning now to the wheels and related elements of the assembly which are shown in relevant part in FIG. 3, wheels 80 are connected to axle assembly 30 by crank members 70. Crank members 70 are characterized as having spindle portion 72 and spindle 82, crank portion 74, and axle receiving portion 76 having set screw 78. Spindle 82 permits rotatable attachment of wheel 80 to crank member 70 and axle receiving portion 76 permits fixed attachment of crank member 70 to axle assembly 30 via set screw 78. Thus, when axle assembly 30 is caused to pivot by movement of lever arm 60, crank members 70 likewise pivot and cause wheels 80 to travel in an arc. This arc motion causes wheel 80 to elevate or declinate, thus causing wheels 80 to engage the supporting surface or rise and permit tripod legs to engage the supporting surface.

FIGS. 6, 7, and 8 illustrate the versatility of the present invention. In FIG. 6, wheeled assembly 20 is shown wherein axle assembly 30 is in a collapsed or narrow track form. Should a wider tripod stance be desired, locking nut 37 is loosened to permit translation between axle tube 32a and 32b. The legs of the tripod are spread apart to resemble FIG. 7. The difference in the angle created between the legs of the tripod and axle assembly 30 when widening the track of wheels 80 is accommodated by interface assemblies 40. Similarly, for a given track width, interface assemblies 40 will accommodate the change in angle that occurs between the tripod legs and axle assembly 30 when the height of the tripod is varied as shown in FIG. 8.

INDUSTRIAL APPLICABILITY

The present invention can find use in the field of transportation of equipment such as where conventional tripods are used. The ability to modify existing equipment stands to have a wheeled transportation accessory that is only used during transport but does not otherwise generally interfere with the operation of the stand is considered to be of importance to this industry.

What is claimed is:

1. A wheeled accessory for an equipment stand, the equipment stand having at least a first leg, a second leg and a third leg, the first and second legs defining a first plane, the wheeled accessory which comprises:

an axle, the axle having a first end, a second end and a longitudinal axis;

a first mounting interface, the first mounting interface having collar means for securing the first mounting interface to the first leg of the equipment stand, axle block means for mounting the axle to the first mounting interface for pivotal movement with respect thereto about the longitudinal axis of the axle, and means for mounting the axle block means to collar means for pivotal movement with respect thereto about an axis perpendicular to the first plane;

a second mounting interface, the second mounting interface having collar means for securing the second mounting interface to the second leg of the equipment stand, axle block means for mounting the axle to the second mounting interface for pivotal movement with respect thereto about the longitudinal axis of the axle, and means for mounting the axle block means to collar means for pivotal movement with respect thereto about an axis perpendicular to the first plane;

first crank member means for mounting a first wheel having an axis of rotation proximate the first end of the axle such that the axis of rotation of the first wheel is parallel to and offset from the longitudinal axis of the axle;

second crank member means for mounting a second wheel having an axis of rotation proximate the second end of the axle such that the axis of rotation of the second wheel is parallel to and offset from the longitudinal axis of the axle;

a lever having a first end and a second end; and means for mounting the first end of the lever to the axle for pivotal movement therewith between a lever raised position where the first wheel and the second wheel are each in contact with a support surface and a lever lowered position, spaced relatively below the lever raised position, where the first leg and the second leg are each in contact with the support surface.

2. The wheeled accessory of claim 1 further comprising:

means for retaining the lever in the raised position.

3. The wheeled accessory of claim 2 herein the lever retaining means comprises:

a keeper rotatably mounted to the third leg.

4. The wheeled accessory of claim 2 wherein the lever mounting means comprises:

a bayonet mount extending from the axle, the bayonet mount having an opening and a slot defined therein;

a coil spring received in the opening of the bayonet mount; and a locating pin proximate the first end of the lever and extending therefrom for being engagingly received in the slot of the bayonet mount when the first end of the lever is received in the opening of the bayonet mount.

5. The wheeled accessory of claim 2 wherein the first collar means comprises:

a right collar half having a hinge pin bore defined therein proximate a first end thereof, and a retaining bolt bore therethrough proximate a second end thereof;

a left collar half having a hinge pin bore defined therein proximate a first end thereof and a retaining bolt bore therethrough proximate a second end thereof, the left collar half pivotally mounted to the right collar half by a first hinge pin received through the hinge pin bore of the right collar half and through the hinge pin bore of the left collar half;

a first retaining bolt receivable through the retaining bolt bore of the right collar half and through the retaining bolt bore of the left collar half; and the second collar means comprises:

a right collar half having a hinge pin bore defined therein proximate a first end thereof, and a retaining bolt bore therethrough proximate a second end thereof;

a left collar half having a hinge pin bore defined therein proximate a first end thereof and a retaining bolt bore therethrough proximate a second end thereof, the left collar half pivotally mounted to the right collar half by a second hinge pin received through the hinge pin bore of the right collar half and through the hinge pin bore of the left collar half;

a second retaining bolt receivable through the retaining bolt bore of the right collar half and through the retaining bolt bore of the left collar half.

6. The wheeled accessory of claim 2 wherein the first axle block means comprises a first axle block having an axle receiving portion defined therethrough;

the second axle block means comprises a second axle block having an axle receiving portion defined therethrough;

the means for pivotally mounting the first axle block means to the first collar means comprises a pin receiving bore defined in the first axle block;

a pin receiving bore defined in the first collar; and a first pin received through the pin receiving bore of the first axle block and through the pin receiving bore of the first collar;

the means for pivotally mounting the second axle block means to the collar means comprises a pin receiving bore defined in the second axle block;

a pin receiving bore defined in the second collar; and a second pin received through the pin receiving bore of the second axle block and through the pin receiving bore of the second collar;

the first crank member comprises an elongated crank arm having an axle receiving portion defined therein and a spindle extending from the crank arm; and the second crank member comprises an elongated crank arm having an axle receiving portion defined therein and a spindle extending from the crank arm.

7. A wheeled accessory for an equipment stand, the equipment stand having at least a first leg, a second leg and a third leg, the wheeled accessory which comprises:

an axle, the axle having a first end, a second end and a longitudinal axis;

a first mounting interface, the first mounting interface having a first collar for attaching the first mounting interface to the first leg of the equipment stand, a first axle receiving block for mounting the axle to the first mounting interface for pivotal movement with respect thereto about the longitudinal axis of the axle, and means for mounting the first axle receiving block to the first collar for pivotal movement with respect thereto;

a second mounting interface, the second mounting interface having a second collar for attaching the second mounting interface to the second leg of the equipment stand, a second axle receiving block for mounting the axle to the second mounting interface for pivotal movement with respect thereto about the longitudinal axis of the axle, and means for mounting the second axle receiving block to the second collar for pivotal movement with respect thereto;

a first crank member having a spindle, the first crank member mounted to the axle proximate the first end of the axle and extending therefrom, for pivotal movement therewith about the longitudinal axis of the axle;

a first wheel having an axis of rotation, the first wheel rotatably mounted on the first spindle for rotation with respect thereto about the axis of rotation of the first wheel;

a second crank member having a spindle, the second crank member mounted to the axle proximate the second end of the axle and extending therefrom, for pivotal movement therewith about the longitudinal axis of the axle a second wheel having an axis of rotation, the second wheel rotatably mounted on the second spindle for rotation with respect thereto about the axis of rotation of the second wheel; and a lever, the lever having a first end and a second end, the first end of the lever mounted to the axle for pivotal movement therewith about the longitudinal axis of the axle between a lever raised position in which the first wheel and the second wheel is in contact with a support surface and a lever lowered position in which the first leg and the second leg are each in contact with the support surface.

8. The wheeled accessory of claim 7 further comprising: means for retaining the lever in the lever raised position.

9. The wheeled accessory of claim 8 wherein the axle comprises:

a first axle tube;

a second axle tube; and means for mounting the first axle tube to the second axle tube such that the length of the axle is selectively adjustable.

10. The wheeled accessory of claim 9 wherein the means for mounting the first axle receiving block to the first collar for pivotal movement comprises;
a pin received through a pin receiving hole defined in the first collar and a pin receiving hole defined in the first axle receiving block; and the means for mounting the second axle receiving block to the second collar for pivotal movement comprises
a pin received through a pin receiving hole defined in the second collar and a pin receiving hole defined in the second axle receiving block.

11. A wheeled accessory for an equipment stand, the equipment stand having at least a first leg, a second leg and a third leg, the wheeled accessory which comprises:

a first collar having a pin receiving bore;

a first axle block having pin receiving bore and an axle receiving portion defined therein;

a first pin received through the pin receiving bore of the first collar and the pin receiving bore of the first axle block for mounting the first axle block to the first collar for pivotal movement with respect thereto about the first pin;

a second collar having a pin receiving bore;

a second axle block having a pin receiving bore and an axle receiving portion defined therein;

a second pin received through the pin receiving bore of the second collar and the pin receiving bore of the second axle block for mounting the second axle block to the second collar for pivotal movement with respect thereto about the second pin;

an axle, the axle having a longitudinal axis, a first end and a second end, the axle pivotally received in the axle receiving portion of the first axle block and the axle receiving portion of the second axle block for pivotal movement with respect to the first axle block and the second axle block about the longitudinal axis of the axle;

a first crank member, the first crank member secured to the axle proximate the first end thereof for movement with the axle;

a second crank member, the second crank member secured to the axle proximate the second end thereof for movement with the axle;

a first wheel, the first wheel rotatably mounted to the first crank member, the first wheel having an axis, of rotation parallel and offset from the longitudinal axis of the axle;

a second wheel, the second wheel rotatably mounted to the second crank member, the second wheel having an axis of rotation parallel and offset from the longitudinal axis of the axle;

a lever; and means for mounting the lever to the axle for pivotal movement therewith between a lever raised position in which the first wheel and the second wheel are in contact with a supporting surface and a lever lowered position in which the first wheel and the second wheel are not in contact with the supporting surface.

12. The wheeled accessory of claim 11 further comprising:

means for releasably retaining the lever in lever raised position.

13. The wheeled accessory of claim 12 wherein the lever retaining means comprises:

a keeper rotatably mounted to the third leg.

14. The wheeled accessory of claim 13 wherein the lever is elongated, having a first end and a second end; and the lever mounting means comprises:
a bayonet mount extending from the axle, the bayonet mount having an opening and a slot defined therein;
a coil spring received in the opening of the bayonet mount; and
a locating pin proximate the first end of the lever and extending therefrom for being engagingly received in the slot of the bayonet mount when the first end of the lever is received in the opening of the bayonet mount.

15. The wheeled accessory of claim 14 wherein the axle is formed of a first half axle and a second half axle, the second half axle slidably received in the first half axle such that the length of the axle is adjustable.

16. The wheeled accessory of claim 15 wherein the first collar comprises:
- a right collar half having a hinge pin bore defined therein proximate a first end thereof, a retaining bolt bore therethrough proximate a second end thereof;
- the left collar half having a hinge pin bore defined therein proximate a first end thereof and a retaining bolt bore therethrough proximate a second end thereof, the left collar half pivotally mounted to the right collar half by a first hinge pin received through the hinge pin bore of the right collar half and through the hinge pin bore of the left collar half;
- a first retaining bolt receivable through the retaining bolt bore of the right collar half and through the retaining bolt bore of the left collar half; and the second collar comprises:
- a right collar half having a hinge pin bore defined therein proximate a first end thereof, a retaining bolt bore therethrough proximate a second end thereof;
- a left collar half having a hinge pin bore defined therein proximate a first end thereof and a retaining bolt bore therethrough proximate a second end thereof, the left collar half pivotally mounted to the right collar half by a second hinge pin received through the hinge pin bore of the right collar half and through the hinge pin bore of the left collar half;
- a second retaining bolt receivable through the retaining bolt bore of the right collar half and through the retaining bolt bore of the left collar half.

* * * * *

UNITED STATES PATENT AND TRADEMARK OFFICE
CERTIFICATE OF CORRECTION

PATENT NO. : 5,484,154
DATED : January 16, 1996
INVENTOR(S) : Frank R. Ward

It is certified that error appears in the above—identified patent and that said Letters Patent is hereby corrected as shown below:

At column 5, line 58, delete the word "herein" and insert --wherein--
At column 8, line 2, after the word "having" insert --a--
At column 9, line 10, delete the word "the" and insert --a--

Signed and Sealed this

Sixteenth Day of April, 1996

Attest:

BRUCE LEHMAN

Attesting Officer     Commissioner of Patents and Trademarks